US011093565B2

(12) United States Patent
Raman et al.

(10) Patent No.: US 11,093,565 B2
(45) Date of Patent: *Aug. 17, 2021

(54) METHODS AND SYSTEMS FOR IDENTIFYING MULTIPLE DEVICES BELONGING TO A SINGLE USER BY MERGING DETERMINISTIC AND PROBABILISTIC DATA TO GENERATE A CROSS DEVICE DATA STRUCTURE

(71) Applicant: Adobe Inc., San Jose, CA (US)

(72) Inventors: Karthik Raman, San Francisco, CA (US); Nedim Lipka, Santa Clara, CA (US); Matvey Kapilevich, Irvington, NY (US)

(73) Assignee: ADOBE INC., San Jose, CA (US)

( * ) Notice: Subject to any disclaimer, the term of this patent is extended or adjusted under 35 U.S.C. 154(b) by 194 days.

This patent is subject to a terminal disclaimer.

(21) Appl. No.: 16/287,546

(22) Filed: Feb. 27, 2019

(65) Prior Publication Data

US 2019/0197072 A1 Jun. 27, 2019

Related U.S. Application Data

(63) Continuation of application No. 15/269,928, filed on Sep. 19, 2016, now Pat. No. 10,255,371.

(51) Int. Cl.
*G06F 16/9535* (2019.01)
*G06F 16/28* (2019.01)
*G06N 7/00* (2006.01)

(52) U.S. Cl.
CPC ........ *G06F 16/9535* (2019.01); *G06F 16/285* (2019.01); *G06N 7/005* (2013.01)

(58) Field of Classification Search
CPC ............. G06F 16/9535; G06F 16/3329; G06F 16/353; G06F 16/35; G06F 16/332;
(Continued)

(56) References Cited

U.S. PATENT DOCUMENTS 8,924,295 B2 * 12/2014 Aaron ................ G06Q 20/3224
705/44
9,251,012 B2 * 2/2016 Barton ................ G06F 11/1458
(Continued)

OTHER PUBLICATIONS

U.S. Appl. No. 15/269,928, "First Action Interview Office Action Summary", dated Aug. 28, 2018, 7 pages.
(Continued)

*Primary Examiner* — Phong H Nguyen
(74) *Attorney, Agent, or Firm* — Kilpatrick Townsend & Stockton LLP

(57) ABSTRACT

Systems and methods are disclosed for clustering multiple devices that are associated with particular users by utilizing both probabilistic and deterministic data derived from analytics information on the users. An analytics computing system generates at least one deterministic device cluster that groups a first set of devices associated with a first user. The first set of devices share deterministic user identifiers specific to the first user. The analytics computing system also identifies a probabilistic link between a device in the first set of devices and additional devices. The probabilistic link indicates common usage patterns between two devices. Based on the probabilistic link, the analytics computing system generates a data structure that includes the deterministic device cluster and the additional devices.

20 Claims, 3 Drawing Sheets

(58) Field of Classification Search
CPC ............... G06F 16/00; G06F 17/30598; G06F 17/30867; G06F 3/1204; G06F 17/211; G06F 17/3053; G06F 21/31; G06F 16/285; G06F 16/29; G06N 7/005; H04L 51/12; G06Q 50/01
USPC ................................. 707/722, 736, 737, 741
See application file for complete search history.

(56) References Cited

U.S. PATENT DOCUMENTS

| | | | |
|---|---|---|---|
| 9,686,127 | B2 | 6/2017 | Ramachandran et al. |
| 10,019,180 | B1 | 7/2018 | Miah et al. |
| 10,255,371 | B2 | 4/2019 | Raman et al. |
| 10,623,162 | B2* | 4/2020 | Bugenhagen ......... H04L 5/0053 |
| 2008/0281694 | A1* | 11/2008 | Kretz ................. G06Q 30/0267 |
| | | | 705/14.64 |
| 2012/0131139 | A1 | 5/2012 | Siripurapu et al. |
| 2015/0007043 | A1* | 1/2015 | Steinmetz ............ G01C 21/367 |
| | | | 715/745 |
| 2015/0058393 | A1* | 2/2015 | Smith .................... H04L 67/10 |
| | | | 709/201 |
| 2016/0014692 | A1 | 1/2016 | Kim et al. |
| 2016/0014715 | A1 | 1/2016 | Patil et al. |
| 2016/0065626 | A1 | 3/2016 | Jain et al. |
| 2016/0080280 | A1 | 3/2016 | Ramachandran et al. |
| 2016/0182657 | A1* | 6/2016 | Mukherjee ............ H04L 67/303 |
| | | | 709/223 |
| 2016/0224901 | A1* | 8/2016 | Scarr .................... H04W 4/029 |
| 2017/0026157 | A1* | 1/2017 | Bugenhagen ........... H04W 4/70 |
| 2018/0027084 | A1 | 1/2018 | Lipka et al. |
| 2018/0081960 | A1 | 3/2018 | Raman et al. |

OTHER PUBLICATIONS

U.S. Appl. No. 15/269,928, "First Action Interview Pilot Program Pre-Interview Communication", dated Jul. 26, 2018, 4 pages.
U.S. Appl. No. 15/269,928, "Notice of Allowance", dated Nov. 29, 2018, 11 pages.

* cited by examiner

METHODS AND SYSTEMS FOR IDENTIFYING MULTIPLE DEVICES BELONGING TO A SINGLE USER BY MERGING DETERMINISTIC AND PROBABILISTIC DATA TO GENERATE A CROSS DEVICE DATA STRUCTURE

CROSS-REFERENCE TO RELATED APPLICATIONS

This application claims priority to and is a continuation of U.S. application No. 15/269,928, filed Sep. 19, 2016, the entire contents of which are incorporated herein by reference.

RELATED APPLICATIONS

The present application is a continuation of U.S. application Ser. No. 15/269,928 for "Methods and systems for identifying multiple devices belonging to a single user by merging deterministic and probabilistic data to generate a cross device data structure" filed Sep. 19, 2016, which is incorporated by reference herein in its entirety.

TECHNICAL FIELD

This disclosure relates generally to computer-implemented methods and systems and more particularly relates to improving the efficiency and effectiveness of computing systems used in identifying multiple electronic devices used by a particular individual user.

BACKGROUND

Individual users commonly have multiple electronic devices. For example, an individual user may have a desktop computer, a laptop, a tablet, a cell phone, and a work computer. It is desirable to determine a set of devices that are associated with a particular user so that, when actions on those devices are tracked, the actions can be associated with a particular user profile and collectively used, for example, to identify and provide targeted marketing and content to the user. However, identifying a set of devices associated with a particular user is often difficult because users commonly have multiple devices, share devices with other users, borrow devices from one another, and use public-access devices. For example, a particular user may view an advertisement for a product on the user's mobile phone while at home. Once the user arrives at work, the user may perform online research for the product using the user's work computer. At the end of the day, the user purchases the product from the user's home computer. By using three different devices in this example (the user's phone, work computer, and home computer), the marketer that provided the original advertisement as displayed on the mobile phone sees the advertisement as wasted ad placement dollars because no purchase was made using the mobile phone. Further, the advertiser is not able to gain an understanding as to the sequence of events and the user's research done to arrive at the successful purchase because there is currently no ability to link the various devices together accurately to identify the user as a single person using multiple devices to receive the advertisement, research the product, and purchase the product.

Current techniques for identifying which devices belong to a particular user are limited in that the current techniques do not scale accurately for large data sets providing analytics information on millions of devices. In deterministic methods for identifying groups of devices associated with a particular user, an analytics system identifies multiple devices that share deterministic user identifiers, such as a login pattern for logging into one or more online services. However, while deterministic methods provide accuracy in identifying multiple devices for a user, the deterministic methods lack the scale required for large scale data analytics for data collected on millions of users operating millions of devices and interacting with thousands of different Internet brands. For example, deterministic data may not be available for many user devices or online services. There is thus a need for clustering multiple devices to identify particular users in a way that provides both accuracy and scale for large scale data analytics.

SUMMARY

The systems and methods disclosed herein involve grouping user devices using a combination of deterministic and probabilistic data to facilitate collecting analytics information for particular users that operate multiple devices. By grouping devices using both deterministic and probabilistic data, techniques herein described allow an analytics system to consider very large data-sets of devices and users while maintaining accuracy in identifying the users. In one embodiment, an analytics computing system analyzes analytics information collected on a plurality of users and user devices to generate a deterministic device cluster that groups a first set of devices that share one or more user identifiers specific to a first user. For example, the user identifiers specific to the first user include login patterns or other user authentication information entered by the user to log in to online services using the first set of devices. The analytics computing system also identifies at least one probabilistic link between a first device of the first set of devices and additional devices. A probabilistic link indicates common usage patterns determined between two devices. For example, a probabilistic link includes common network IP addresses associated with two devices or common geographic locations associated with both devices over a period of time. A probabilistic link between two devices indicates that there is a likelihood that the two devices are operated by the same user. For example, two devices that are associated with the same two network IP addresses at different points of time while at two different geographic locations indicates a likelihood that the two devices are frequently transported by a single user as the devices connect to the same two wireless networks. Based on the probabilistic link, the analytics computing system generates a hybrid cross-device data structure that includes data identifying the first set of devices grouped in the deterministic device cluster and data identifying the additional devices found to share a probabilistic link with the first set of devices. The hybrid cross-device data structure is unique in that it is generated from derived analytics data that is a combination of deterministic data and probabilistic data. Based on the techniques disclosed herein, the hybrid cross-device data structure is used to collect subsequent analytics data on the first user as the user operates either the first set of devices or the additional devices.

Because the data structure that is generated includes data formulated from both deterministic and probabilistic signals, techniques disclosed herein provide a unique solution to the problem of how to identify which devices are associated with particular users in an analytics environment when considering extremely large data sets. Techniques herein allow for efficient processing of the large data sets such that the identified grouping of devices provides both scale and accuracy.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
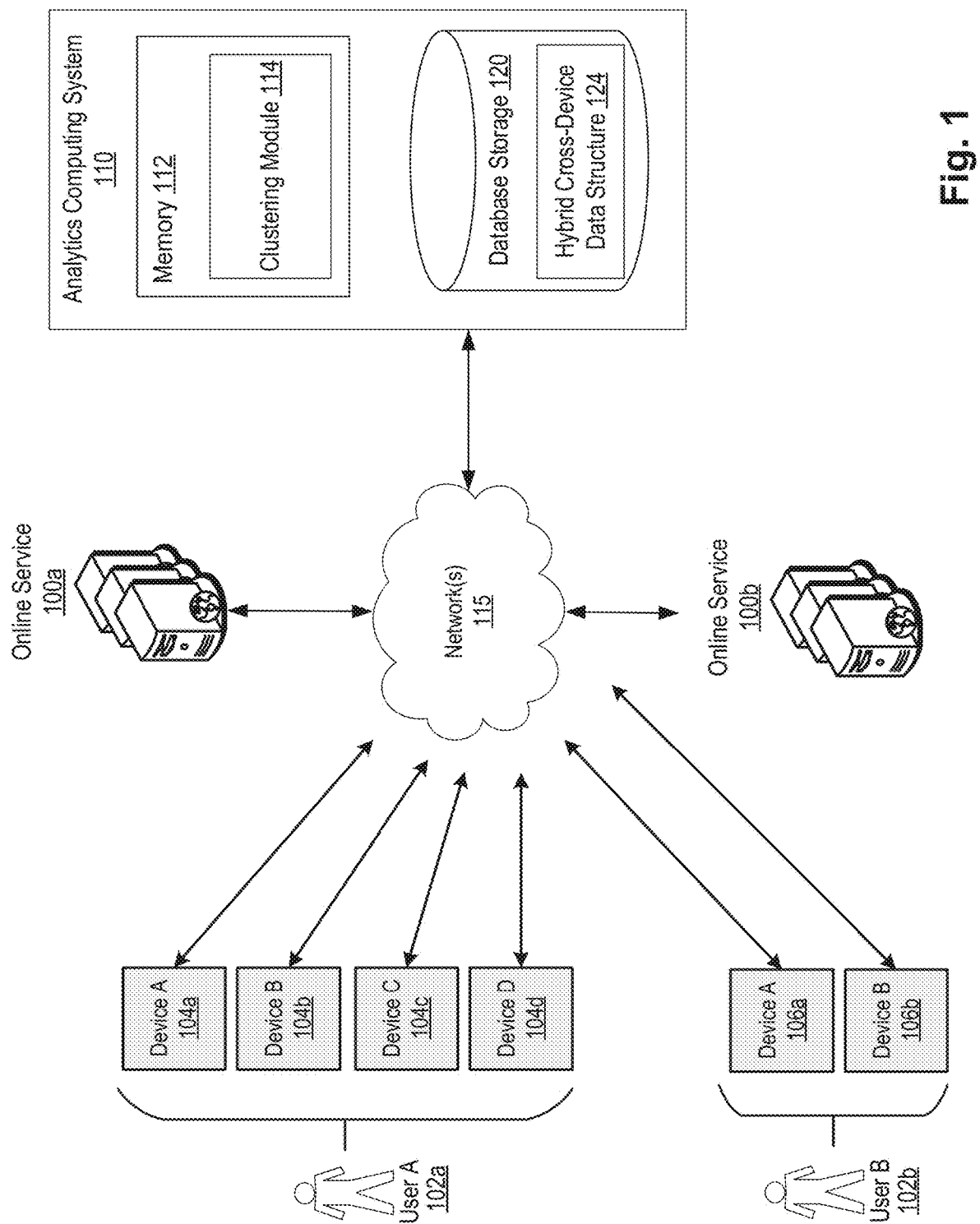
FIG. 1 is a block diagram depicting an example of a computing environment for merging deterministic and probabilistic information from analytics data to generate a cluster of devices associated with a particular user, according to aspects disclosed herein.

Systems and methods are provided for identifying a set of devices that are associated with a particular user for improved scale and accuracy when collecting analytics data for the particular user. In embodiments disclosed herein, an analytics computing system receives analytics information on multiple tracked user devices, as collected by third parties, such as marketers, advertisers, and other tracking entities. The analytics computing system analyzes the analytics data to derive a deterministic device cluster by grouping a set of devices that share user identifiers specific to a particular user. For example, identifiers specific to a user include the user's login patterns that are entered on multiple devices to log in to various online services. The analytics computing system also analyzes the analytics data to identify a probabilistic link that indicates common usage patterns between at least one device in the deterministic device cluster and additional devices. Based on the probabilistic link (i.e. the common usage pattern found among both a device in the deterministic data cluster and the second cluster of devices), the analytics computing system then merges the first cluster of devices (provided by the deterministic data signal) and the second cluster of devices. The analytics computing system provides the merged group of devices as a hybrid cross-device data structure that may be used by marketers to collect analytics data on a user when the user operates the devices.

Accordingly, unlike existing techniques that lack accuracy for large-scale data analytics, techniques disclosed herein allow an analytics system to cluster groups of devices determined to be associated with a single user by merging deterministic data that identifies groups of devices that that share user login information with probabilistic data indicating which additional devices exhibit usage patterns similar to the groups of devices identified by the deterministic data. By using probabilistic signals to expand the deterministic device cluster identified as being associated with a particular user, techniques disclosed herein improve the accuracy for large-scale data analytics where deterministic data may not be available for all devices.

Illustrative Use Cases

In one example, consider a user named "Joe" who operates multiple devices: device A (a mobile phone), device B (a tablet computer), device C (a desktop computer), device D (a second desktop computer), and device E (a laptop computer). Joe operates devices A, B, and C while at home and operates devices A, D, and E while at work. Techniques disclosed herein allow an analytics computing system to determine that all devices A-E are associated with the particular user Joe. The analytics computing system first receives a deterministic device cluster that identifies a group of devices that were used to log into/authenticate with one or more unique user accounts for a particular user. In this example, consider that the deterministic device cluster includes the devices A, B, and C. The deterministic device cluster, in this example, indicates that A and B were used to log into user "Joe's" account at an online social media provider. The deterministic device cluster also indicates that B and C were used to log into user "Joe's" account at an online search provider. Because device B was used to log into both Joe's accounts at the social media provider and the search provider, the deterministic device cluster allows the analytics computing system to identify devices A, B, and C as operated by user "Joe." Note that in this example, devices D and E (Joe's devices at work) are not used to log into Joe's online accounts and are thus not identified in the deterministic device cluster.

In addition to the deterministic device cluster, the analytics computing system also receives a probabilistic signal identifying a probabilistic link between one or more devices in the deterministic device cluster and additional devices not included in the deterministic device cluster. In this example, the probabilistic signal identifies the IP addresses associated with each of the devices A-E. The probabilistic signal identifies that devices A-B-C are associated with the IP address for Joe's home network. Similarly, the probabilistic signal identifies that devices A-D-E are associated with the IP address for Joe's work network. Using the probabilistic signal, the analytics computing system identifies a probabilistic link between device A and device D and E, because devices A, D, and E are all associated with the IP address for Joe's work network. Based on the probabilistic signal, the analytics computing system combines the deterministic device cluster (devices A, B, and C all associated with unique logins for Joe's online services) with the set of devices (D and E) that share a probabilistic link with at least one of the devices (device A) in the deterministic device cluster. The analytics computing system includes the merged set of devices in a hybrid cross-device data structure that is used to provide additional analytics information for all identified devices associated with the user Joe. Through the techniques described herein, the analytics computing device is able to identify devices A-E as the devices associated with the user Joe.

In additional embodiments, the techniques herein also allow the analytics computing system to further refine the merged set of devices provided in the hybrid cross-device data structure in situations where a probabilistic signal joins multiple deterministic device clusters. Multiple deterministic device clusters indicate the presence of more than one user. In one technique, the analytics computing system receives multiple deterministic device clusters, each associated with a particular set of login patterns or other unique user identifiers associated with a specific user. Considering an example, consider user Joe an individual who uses devices A, B, C at home and devices A and D at work. Further, consider user Jane, a member of Joe's household, that utilizes device E at home and device F at work. The analytics computing system receives analytics information including a first deterministic device cluster indicating devices A, B, and C share similar login patterns for user Joe. The analytics information also includes a second deterministic device cluster indicating devices E and F share similar login patterns for user Jane. Joe and Jane are members of the same house and thus share an IP address for a home area network. Accordingly, the analytics computing system receives a probabilistic signal indicating that device A shares a probabilistic link with device D (i.e. both devices A and D share an IP address for the Joe's work network) and that device A shares a probabilistic link with device E (i.e. that both devices A and E share an IP address for the home network). Accordingly, the probabilistic signal received by the analytics computing system indicates that devices A, B, and C share a probabilistic link with devices D and E, resulting in a cluster of devices A, B, C, D, and E as being associated with Joe. However, the analytics computing device utilizes the second deterministic device cluster to determine that device E is not associated with Joe as device E shares a common set of login patterns (Jane's login patterns) with device F. The analytics computing device thus generates a hybrid cross-device data structure that includes a first cluster of devices A, B, C, and D as associated with Joe and a second cluster of devices E and F as associated with Jane.

In another example, techniques herein allow an analytics computing system to expand a deterministic cluster that includes a single device to also group together devices found in an overlapping probabilistic cluster of devices. For example, in some situations a marketer has obtained login patterns or other deterministic user identifiers for a user only for a single device (e.g., user Joe accesses his social media account only on device 'A', his mobile phone). If the analytics computing system determines that a probabilistic cluster of devices also covers the single device deterministic cluster, the analytics computing system groups the single device in the deterministic device cluster with the additional devices from the probabilistic device cluster. For example, consider that user Joe operates a home computer device 'B,' and a work computer device 'C', yet does not log into his social media account on devices B or C. The analytics computing system receives, as part of analytics information, a probabilistic signal indicating that device A shares a probabilistic link with both device B and device C. Specifically, the probabilistic signal indicates that devices A and B are both associated with frequently occurring IP addresses for Joe's home area network and that devices A and C are are both associated with frequently occurring IP addresses for Joe's work network. The analytics computing system expands the single device deterministic cluster that includes device A with devices B and C, as devices B and C are found in the overlapping probabilistic device cluster A, B, and C.

In additional embodiments, techniques described herein allow for clustering multiple devices as identified as being associated for a particular user by creating a deterministic link between two different probabilistic clusters. For example, consider a particular user that operates two devices at home (a desktop computer and a tablet computer, referred to in this example as 'A' and 'B') and two devices at work (a mobile phone and a desktop computer, referred to in this example as 'C' and 'D'). Also consider that the user logs into a unique user account at an online service using device A at home and using device D at work. Because devices A and B are the user's devices at home and share an IP address for the home network, the analytics computing system receives a probabilistic signal indicating that devices A and B are associated with a frequently occurring IP address. Similarly, the analytics computing system receives a second probabilistic signal indicating that devices C and D are associated with a frequently occurring IP address. The analytics computing system determines that a first probabilistic device cluster includes devices A and B and a second probabilistic device cluster includes devices C and D. The analytics computing system also receives a deterministic signal indicating that devices A and D share login patterns for the user. Based on the deterministic signal, the analytics computing system creates a deterministic link between the first probabilistic device cluster and the second probabilistic device cluster. Accordingly, the resulting grouping of devices identified as associated with user Joe include devices A, B, C, and D.

The techniques disclosed herein provide numerous benefits over prior device grouping techniques. The techniques disclosed herein provide accurate, scalable ways to find clusters in heterogeneous information networks. The techniques are implemented without regard to how many clusters are used and are adaptable to more than one clustering strategy. In addition, starting with a large data set of devices and deterministic clusters for those devices and expanding the clusters via probabilistic links allows for efficient processing. Specifically, the techniques herein efficiently and accurately group deterministic device clusters with additional devices identified as sharing probabilistic links with the deterministic device clusters even when the number of devices in the data set is in the millions or billions. Numerous other benefits are provided as well as will be evident to those skilled in the art.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a block diagram depicting a computing environment in which an analytics computing system 110 receives analytics information on multiple user devices 104a-d, 106a-b and identifies which users 102a-b are associated with user devices 104a-d, 106a-b using techniques described herein. The users 102a-b include individuals that are using user devices 104a-d, 106a-b to connect to and access one or more online services 100a-b. While a limited number of users 102a-b, user devices 104a-d, 106a-b, and online services 100a-b are depicted for illustrative purposes, the techniques described herein apply to large-scale data analytics collected on millions and/or billions of users, user devices as the users access numerous online services.

Users 102a-b access online services 100a-b via network 115 (e.g., the Internet) by operating user devices 104a-d, 106a-b. User devices 104a-d, 106a-b include any device that is used to transmit/receive content over the Internet, including smartphone devices, tablet devices, desktop computers, laptop computers, wearable smart devices such as smart watches, etc. Online services 100a-b include any entity that provides, publishes, or otherwise makes available content on the Internet. For example, online services 110a-b include web site providers and operators, social media platforms, computer desktop applications and mobile apps communicating content via the Internet, and other suitable software services. Online services 110a-b are hosted on computing systems (not shown) that include any suitable computer servers, portable computing device, virtual computing devices, content data network, data center, or other computing devices. As users 102a-b access the online services 110a-b via user devices 104a-d, 106a-b, the devices 104a-d, 106a-b generate network traffic from which analytics information on the devices 104a-d, 106a-b and on the users 102a-b is collected and transmitted to analytics computing system 110. For example, when users 102a-b connect to online services 100a-b that are websites, users 102a-b interact with HTML/XML tags that are embedded in the website and that are programmed to collect user and device information from the user devices 104a-d, 106a-b and transmit the user and device information as part of analytics information to analytics computing system 110. For example, user and device information transmitted as analytics information to analytics computing system 110 includes geographic location of the user device, device identifiers such as IP address, web browser/Internet application identifiers, the duration of time spent accessing the online service, advertising information or other content displayed to the user, and other analytics information. User and device information in some aspects is captured in a tracking cookie and transmitted to the analytics computing system 110.

In some embodiments, users 110a-b provide login information to access unique user accounts for the respective users on online services 100a-b. For example, login information includes user names and passwords and other user authentication information entered on devices 104a-d, 106a-b to access online services 100a-b. A user's anonymous login information is also transmitted as part of the analytics information from online service 100a-b to analytics computing system 110 in the form of, for example, encrypted hash identifiers for the respective user 102a-b.

To collect the analytics data from online interactions of users 102a-b, the online services 100a-b include in some aspects data analytics recorders (not shown) configured to collect user and device information. A data analytics recorder includes any form of data analytics tracking, such as program code modules that execute scripts (e.g., Javascripts), tracking cookies, embedded code, or other software for tracking and recording data representative of the user and device information. In an example, the scripts, tracking cookies, or other embedded code for tracking is provided by the online service 100 to user devices 104a-d, 106a-b along with any content (e.g. web pages) transmitted to users devices 104a-d, 106a-b. The scripts, tracking cookies, or other embedded code capture relevant user and device data from user devices 104a-d, 106a-b and return the tracked data back to online service 100. The online service 100 in some aspects is also configured to automatically, periodically, or at time intervals send the collected user and device data the analytics computing system 110.

The analytics computing system 110 includes one or more computer servers that include a memory 112 for executing programmable code providing instructions for a clustering module 114. The clustering module 114 includes a software application that analyzes the received analytics information (i.e. the user and device information) received from online services 100a-b. The clustering module 114 analyzes the analytics information identify a deterministic group of devices that share a deterministic user identifier specific to a user (e.g., devices 104a-c as associated with user 102a). The clustering module 114 also analyzes the analytics information to identify a probabilistic link between additional devices (e.g., device 104d) and the set of devices in the deterministic device cluster (e.g., devices 104a-c). The analytics computing system 110 generates a hybrid cross-device data structure by combining the user devices 104a-c as identified as being associated with user 102a in the deterministic device cluster with user device 104d shown to share a probabilistic link with user devices 104a-c.

The analytics computing system 110 includes one or more computer servers that include or have access to database storage 120 that stores analytics data and any analysis data output from the clustering module 114. The database storage 120 includes a hybrid cross-device data structure 124 stores information identifying devices 104a-d, 106a-b as being associated with particular users 102a-b, respectively. For example, the hybrid cross-device data structure 124 is implemented as one or more database tables, software arrays, or hash tables. The identification of devices associated with specific users that is stored in the data structure is based on a merged combination of deterministic data and probabilistic data. The combination of devices identified via deterministic data and probabilistic data is a hybrid grouping of devices that is specially suited for identification of users across devices for very large scale data sets while still providing high degrees of accuracy.

The identified groupings of user devices 104a-d, 106a-b as associated with specific users 102a-b, respectively, is provided to a content provider, such as an advertising entity, in communication with the analytics computing system 110. A content provider, marketer, advertiser, or other entity utilizes the information provided in the hybrid cross-device data structure 124 to identify users even as users operate multiple devices.

Figure 2:
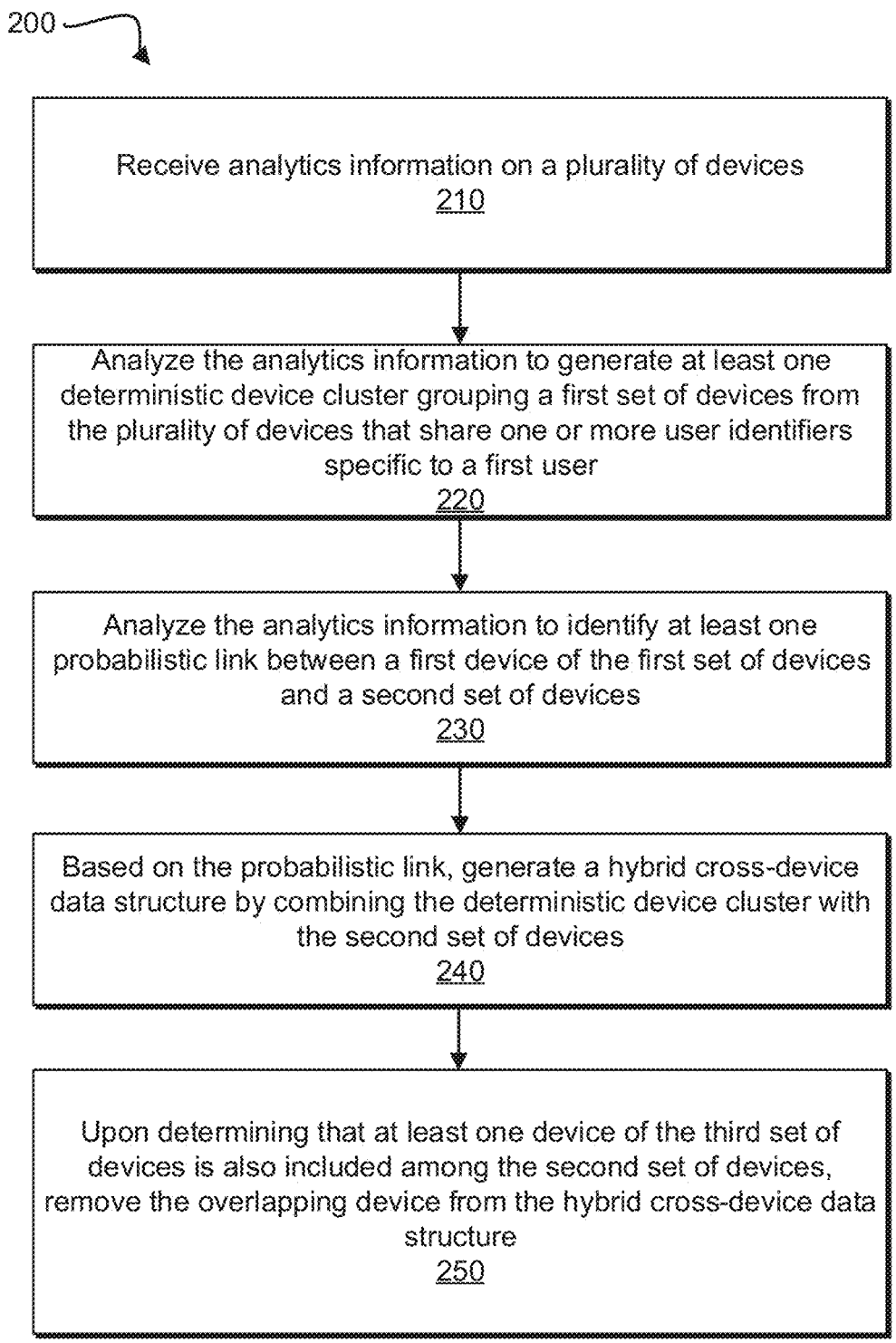
FIG. 2 is a flowchart illustrating an exemplary method for merging deterministic and probabilistic information to generate a cluster of devices associated with a particular user, according to aspects disclosed herein.

FIG. 2 is a flowchart depicting an example process 200 for clustering multiple devices to identify a particular user of those devices using a combination of deterministic and probabilistic signals. The analytics computing system 100 includes the generated cluster of multiple devices using a combination of deterministic and probabilistic signals in a hybrid cross-device data structure. Techniques disclosed herein allow for improved scale and accuracy for large data sets when collecting analytics data for particular users using multiple devices. The process 200 is implemented as a software algorithm that is executed by one or more of the components listed in FIG. 1 or in any suitable computing or communication environment. For example, the steps of process 200 may be embodied in program code (i.e. clustering module 114) stored in a computer-readable medium (i.e. memory 112), the program code executed by a processor for analytics computing system 110.

The process 200 includes receiving, at an analytics computing system 110, analytics data on a plurality of devices 104a-d, 106a-b, as shown in block 210. The analytics data includes information gathered from user interactions with one or more online services 100a-b. For example, analytics data includes information on the geographic location of connecting user devices 104a-d, 106a-b, IP addresses of the devices 104a-d, 106a-b, conversion data resulting from e-commerce conducted on the online services 100a-b, and other suitable user and device information. The analytics computing system 110 receives the analytics data on the plurality of devices 104a-d, 106a-b via a network interface to receive the data over network 115 from online services 100a-b.

The process 200 further includes generating, from the analytics information, at least one deterministic device cluster grouping a first set of devices from the plurality of devices, as shown in block 220. The deterministic device cluster is generated by grouping user devices 104a-d, 106a-b that share one or more user identifiers specific to a user. User identifiers provide the deterministic data derived from analytics data and include any suitable identifier unique to a user. For example, user identifiers include user login patterns that users 102a-b entered in devices 104a-d, 106a-b to log into user accounts unique to the respective users on online services 100a-b. The clustering module 114 executing in the analytics computing system 110 iterates through the analytics data to group devices 104a-d, 106a-b that share login patterns for specific users 102a-b. For example, consider user 102a as using devices 104a-b to log into a unique user account for user 102a at online service 100a. Similarly, user 102a uses devices 104b-c to log into a unique user account at online service 100b. The clustering module 114 identifies from the analytics data that a first login pattern for user 102a was used to access and login to online service 100a at different times while using devices 104a-b. Similarly, the clustering module 114 identifies that a second login pattern for user 102a was used to access and login to online service 100b at different times while using devices 104b-c. Because device 104b links is associated with the first login pattern (also used for device 104a) and the second login pattern (also used for device 104b), the analytics computing system 110 determines that all three devices 104a-c are associated with a specific user (i.e. user 102a. The clustering module 114 generates a deterministic device cluster that includes the devices 104a-c, the deterministic device cluster being associated with user 102a. Note that while user 102a is specifically referred to herein for illustrative purposes, it should be understood that clustering module 114 identification of user 102a may be anonymized (e.g., via a hash identifier that links devices 104a-c as being associated with a particular user).

While embodiments herein describe user login patterns associated with unique user accounts for online services as providing the deterministic data for identifying specific users, it should be understood that in other embodiments deterministic data is derived from a combination of user and device characteristics that identify a user. For example, user identifiers include any combination of login patterns, login sites, device identifiers (e.g., device serial number other signature), or pattern of geographic location trajectories.

The process 200 further includes identifying, from the analytics information, at least one probabilistic link between a first device of the first set of devices and additional devices from the plurality of devices, as shown in block 230. A probabilistic link includes any suitable user or device identification that indicates a common usage pattern between two devices. For example, a probabilistic link includes a frequently occurring IP address that is common between devices. Another example of a probabilistic link is a time identifier or geographic location identifier indicating that two devices are frequently located a different locations at similar points in time. The clustering module 114 identifies one or more probabilistic links between devices in the deterministic device cluster and additional devices by iterating through the analytics data for the additional devices and identifying similar usage patterns (e.g., frequently occurring IP addresses). For example, consider that clustering module identified and grouped together a deterministic device cluster including devices 104a-b as associated with user 102a. Also consider, in this example, that the analytics data indicates that one or both of devices 104a-b are associated with IP addresses that are also associated with devices 104c-d (e.g., if user 102a operates device 104a at home, associating device 104a with a first IP address, device 104b at work, associating device 104b with a second IP address, and devices 104c-d at work, also associating devices 104c-d with the second IP address). The clustering module accordingly identifies a probabilistic link between devices 104b and devices 104c-d. The probabilistic link identifies similar usage patterns between devices 104b and devices 104c-d in that all three devices are frequently associated with the same IP address.

The probabilistic link in some embodiments is identified through a combination of user or device identifications. For example, the probabilistic link in some embodiments is identified by determining that two devices that are both associated with a common IP address at a particular repeating duration of time (e.g., at a particular time of day on a weekly basis). Additionally, because certain devices are mobile and switch between various wireless networks and thus associated with multiple IP addresses, in some aspects the clustering module 114 identifies the probabilistic link by considering the most frequently occurring IP addresses for a given device.

The process 200 further includes, based on the probabilistic link, generating a hybrid cross-device data structure that includes the deterministic device cluster and the additional devices identified in the probabilistic link, as shown in block 240. The hybrid cross-device data structure indicates that the first set of devices and the second set of devices are associated with a particular user. For example, clustering module 114 generates a hybrid cross-device data structure 124 in the form of a software database, such as a hash table or other software array for storing information indicating that devices 104a-d are associated with user 102a. The hybrid cross-device data structure 124 thus merges device clusters found in both deterministic and probabilistic signals and includes the merged cluster of devise in the software database, allowing a marketer, advertising entity or other content provider to target a specific user (e.g., user 102a) and collect additional analytics data on the user when the user 102a operates devices 104a-d. By merging data found in probabilistic and deterministic sources of analytics, the clustering module 114 is thus able to identify a particular user 102a as being associated with devices 104a-d with a high degree of accuracy at large scale data sets (e.g., for data on millions or billions of various devices).

The process 200 further includes, generating, from the analytics information, a second deterministic device cluster grouping a third set of devices that share one or more additional user identifiers specific to a second user, as shown in block 240. The clustering module 114 iterates through the analytics data to identify user identifiers specific to a second user and groups the devices associated with the user identifiers. For example, consider a scenario where two users are located in the same household and thus analytics data on devices used by the respective users indicates a common IP address. Consider that devices 104a-b are included in a first deterministic device cluster (e.g., user 102a logs into online service 100a using particular login patterns while operating devices 104a-b). Also consider that the analytics data also indicates that device 104b shares a probabilistic link with a second set of devices 104d, 106a-b (e.g., devices 104d, 106a-b are all frequently connected to the home area network and thus with a common IP address). The analytics information received by analytics computing system 110 also indicates that devices 106a-b (e.g., the third set of devices) share login patterns specific to user 102b. Accordingly, the clustering module 114 generates a second deterministic device cluster grouping devices 106a-b.

The process 200 further includes based on determining that at least one device of the third set of devices is also included among the second set of devices, removing the one device from the hybrid cross-device data structure, as shown in block 250. Continuing the example above, devices 104d, 106a-b were grouped together in a second set of devices as sharing a probabilistic link with devices 104a-b. However, the clustering module 114 determines, based on a specific deterministic device identifier specific to user 102b, that devices 106a-b are grouped in a second deterministic device cluster (i.e. which indicates that devices 106a-b are associated with user 102b, not with 102a). Accordingly, the clustering module 114 removes device 104d from the hybrid cross-device data structure 124 because device 104d is not associated with user 102a. Through the techniques shown herein, the clustering module 114 is able to correctly refine the clusters of devices that are associated with particular users by considering both deterministic and probabilistic data.

Figure 3:
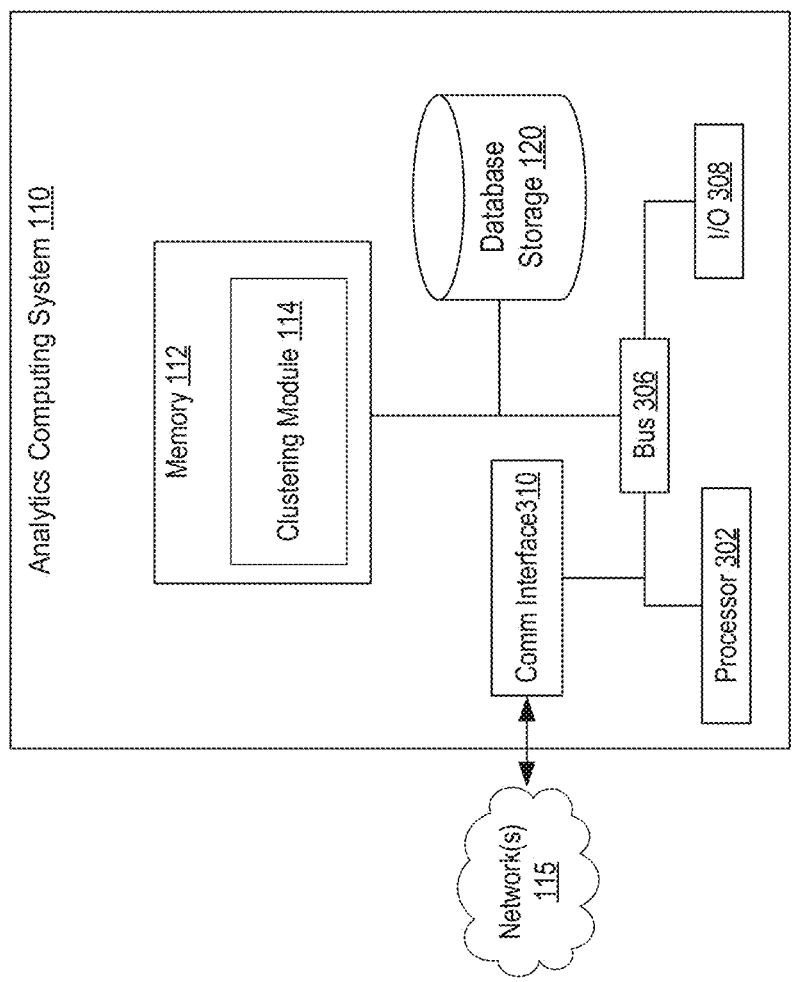
FIG. 3 is a block diagram depicting example hardware implementations for the components described in FIG. 1, according to aspects disclosed herein.

Any suitable device or set of computing devices may be used to execute the techniques described herein. For example, FIG. 3 is a block diagram depicting examples of implementations of such components. The analytics computing system 110 includes a processor 302 that is communicatively coupled to a memory 112 and that executes computer-executable program code and/or accesses information stored in memory 112. The processor 302 comprises, for example, a microprocessor, an application-specific integrated circuit ("ASIC"), a state machine, or other processing device. The processor 302 includes one processing device or more than one processing device. Such a processor is included or may be in communication with a computer-readable medium storing instructions that, when executed by the processor 302, cause the processor to perform the operations described herein.

The memory 112 includes any suitable non-transitory computer-readable medium. The computer-readable medium includes any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions include processor-specific instructions generated by a compiler and/or an interpreter from code written in any suitable computer-programming language, including, for example, C, C++, C #, Visual Basic, Java, Python, Perl, JavaScript, and ActionScript. The analytics computing system 110 also comprises a number of external or internal devices such as input our output devices. For example, the analytics computing system 110 is shown with an input/output ("I/O") interface 308 that receives input from input devices or provide output to output devices.

The analytics computing system 110 executes program code that configures the processor 502 to perform the operations described above. For example, the program code includes the clustering module 114 resident in memory 112 or any suitable computer-readable medium. In additional or alternative embodiments, the clustering module 114 is resident in a memory that is accessible via a data network, such as a memory accessible to a cloud service. The analytics computing system 110 includes or has access to database storage 120 to store the hybrid cross-device data structure 124 as described above.

The analytics computing system 110 also includes a communication interface 310. The communication interface 310 includes any device or group of devices suitable for establishing a wired or wireless data connection to one or more data networks 115. Non-limiting examples of the communication interface 310 include an Ethernet network adapter, a modem, and/or the like. The analytics computing system 110 transmits messages as electronic or optical signals via the communication interface 310. For example, the analytics computing system 110 receives analytics data from online services 100a-b via communication interface 310. The communication interface 310, processor 302, I/O interface 508, memory 112, and database storage 120 are communicatively coupled via bus 506.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The invention claimed is:

1. A computer-implemented method for generating hybrid cross-device data structures for clustering multiple devices to facilitate improved scale and accuracy when collecting analytics data for particular users of the multiple devices, wherein the computer-implemented method includes one or more processing devices of an analytics computing system performing operations comprising:

receiving probabilistic data of a plurality of devices and deterministic data of the plurality of devices;

generating (i) a first probabilistic device cluster that includes a first set of devices from the plurality of devices that share a first usage pattern identified from the probabilistic data and (ii) a second probabilistic device cluster that includes a second set of devices from the plurality of devices that share a second usage pattern identified from the probabilistic data, wherein the probabilistic data further comprises location information specifying that (i) the first set of devices and the second set of devices are associated with a first Internet Protocol ("IP") address while at a first geographic location and (ii) the first set of devices and the second set of devices are associated with a second IP address while at a second geographic location;

identifying, from the deterministic data, a deterministic link between a first device from the first set of devices and a second device from the second set of devices, wherein the deterministic link indicates a user identifier that is (i) associated with the first device and with the second device and (ii) specific to a particular user from a plurality of users;

generating, based on the deterministic link, a hybrid cross-device data structure that includes the first probabilistic device cluster and the second probabilistic device cluster, wherein the hybrid cross-device data structure indicates that the first set of devices and the second set of devices are associated with the particular user from the plurality of users; and collecting, based on the hybrid cross-device data structure, subsequent analytics data generated by the particular user operating a device included in the first set of devices or in the second set of devices.

2. The computer-implemented method of claim 1, further comprising:

generating a deterministic device cluster comprising a third set of devices, the deterministic device cluster indicating that the third set of devices share one or more additional user identifiers specific to an additional particular user from the plurality of users;

determining that at least one device of the third set of devices is also included among the first set of devices or among the second set of devices; and based on determining that the at least one device of the third set of devices is also included among the first set of devices or the second set of devices, removing the at least one device from the hybrid cross-device data structure.

3. The computer-implemented method of claim 1, wherein the user identifier specific to the particular user from the plurality of users comprises login patterns used by the particular user from the plurality of users to log in to one or more online services.

4. The computer-implemented method of claim 1, wherein the probabilistic data comprises a set of IP addresses common to the first set of devices and an additional set of IP addresses common to the second set of devices.

5. The computer-implemented method of claim 1, wherein the probabilistic data comprises a pattern of geographic location information for the first set of devices and for the second set of devices over a period of time.

6. The computer-implemented method of claim 1, wherein the user identifier specific to the particular user from the plurality of users comprises a login pattern used to login to a unique user account for an online service,
wherein the login pattern is used to login to the online service via the first device and also via the second device.

7. The computer-implemented method of claim 1, further comprising:
identifying, in the hybrid cross-device data structure, a third device having a third usage pattern identified from the probabilistic data, the third usage pattern distinct from the first usage pattern and the second usage pattern; and
responsive to identifying that the third device has the third usage pattern, modifying the hybrid cross-device data structure to include the third device in a third set of devices included in the hybrid cross-device data structure.

8. An analytics computing system, comprising:
a processor; and
a memory communicatively coupled to the processor, wherein the processor is configured to execute instructions included in the memory to perform operations comprising:
receiving probabilistic data of a plurality of devices and deterministic data of the plurality of devices;
generating (i) a first probabilistic device cluster that includes a first set of devices from the plurality of devices that share a first usage pattern identified from the probabilistic data and (ii) a second probabilistic device cluster that includes a second set of devices from the plurality of devices that share a second usage pattern identified from the probabilistic data, wherein the probabilistic data further comprises location information specifying that (i) the first set of devices and the second set of devices are associated with a first Internet Protocol ("IP") address while at a first geographic location and (ii) the first set of devices and the second set of devices are associated with a second IP address while at a second geographic location;

identifying, from the deterministic data, a deterministic link between a first device from the first set of devices and a second device from the second set of devices, wherein the deterministic link indicates a user identifier that is (i) associated with the first device and with the second device and (ii) specific to a particular user from a plurality of users;

generating, based on the deterministic link, a hybrid cross-device data structure that includes the first probabilistic device cluster and the second probabilistic device cluster, wherein the hybrid cross-device data structure indicates that the first set of devices and the second set of devices are associated with the particular user from the plurality of users; and collecting, based on the hybrid cross-device data structure, subsequent analytics data generated by the particular user operating a device included in the first set of devices or in the second set of devices.

9. The analytics computing system of claim 8, wherein the processor is configured to executed instructions further comprising:
generating, from the analytics computing system, a deterministic device cluster comprising a third set of devices, the deterministic device cluster indicating that the third set of devices share one or more additional user identifiers specific to an additional particular user from the plurality of users;
determining that at least one device of the third set of devices is also included among the first set of devices or among the second set of devices; and
based on determining that the at least one device of the third set of devices is also included among the first set of devices or the second set of devices, removing the at least one device from the hybrid cross-device data structure.

10. The analytics computing system of claim 8, wherein the user identifier specific to the particular user comprises login patterns used by the particular user to log in to one or more online services.

11. The analytics computing system of claim 8, wherein the probabilistic data comprises a set of IP addresses common to the first set of devices and an additional set of IP addresses common to the second set of devices.

12. The analytics computing system of claim 8, wherein the probabilistic data comprises a pattern of geographic location information for the first set of devices and for the second set of devices over a period of time.

13. The analytics computing system of claim 8, wherein the user identifier specific to the particular user comprises a login pattern used to login to a unique user account for an online service,
wherein the login pattern is used to login to the online service via the first device and also via the second device.

14. The analytics computing system of claim 8, wherein the processor is configured to executed instructions further comprising:
identifying, in the hybrid cross-device data structure, a third device having a third usage pattern identified from the probabilistic data, the third usage pattern distinct from the first usage pattern and the second usage pattern; and
responsive to identifying that the third device has the third usage pattern, modifying the hybrid cross-device data structure to include the third device in a third set of devices included in the hybrid cross-device data structure.

15. A non-transitory computer-readable medium embodying program code executable by a computing system, wherein the program code is executable to perform operations comprising:
    receiving probabilistic data of a plurality of devices and deterministic data of the plurality of devices;
    generating (i) a first probabilistic device cluster that includes a first set of devices from the plurality of devices that share a first usage pattern identified from the probabilistic data and (ii) a second probabilistic device cluster that includes a second set of devices from the plurality of devices that share a second usage pattern identified from the probabilistic data, wherein the probabilistic data further comprises location information specifying that (i) the first set of devices and the second set of devices are associated with a first Internet Protocol ("IP") address while at a first geographic location and (ii) the first set of devices and the second set of devices are associated with a second IP address while at a second geographic location;
    identifying, from the deterministic data, a deterministic link between a first device from the first set of devices and a second device from the second set of devices, wherein the deterministic link indicates a user identifier that is (i) associated with the first device and with the second device and (ii) specific to a particular user from a plurality of users;
    generating, based on the deterministic link, a hybrid cross-device data structure that includes the first probabilistic device cluster and the second probabilistic device cluster, wherein the hybrid cross-device data structure indicates that the first set of devices and the second set of devices are associated with the particular user from the plurality of users; and
    collecting, based on the hybrid cross-device data structure, subsequent analytics data generated by the particular user operating a device included in the first set of devices or in the second set of devices.

16. The non-transitory computer-readable medium of claim 15, wherein the program code is executable to perform operations further comprising:
    generating a deterministic device cluster comprising a third set of devices, the deterministic device cluster indicating that the third set of devices share one or more additional user identifiers specific to an additional particular user from the plurality of users;
    determining that at least one device of the third set of devices is also included among first set of devices or among the second set of devices; and
    based on determining that the at least one device of the third set of devices is also included among the first set of devices or the second set of devices, removing the at least one device from the hybrid cross-device data structure.

17. The non-transitory computer-readable medium of claim 15, wherein the user identifier specific to the particular user comprises login patterns used by the particular user to log in to one or more online services.

18. The non-transitory computer-readable medium of claim 15, wherein the probabilistic data comprises a pattern of geographic location information for the first set of devices and for the second set of devices over a period of time.

19. The non-transitory computer-readable medium of claim 15, wherein the user identifier specific to the particular user comprises a login pattern used to login to a unique user account for an online service,
    wherein the login pattern is used to login to the online service via the first device and also via the second device.

20. The non-transitory computer-readable medium of claim 15, wherein the program code is executable to perform operations further comprising:
    identifying, in the hybrid cross-device data structure, a third device having a third usage pattern identified from the probabilistic data, the third usage pattern distinct from the first usage pattern and the second usage pattern; and
    responsive to identifying that the third device has the third usage pattern, modifying the hybrid cross-device data structure to include the third device in a third set of devices included in the hybrid cross-device data structure.

\* \* \* \* \*